United States Patent
Anderson

(10) Patent No.: US 7,500,353 B2
(45) Date of Patent: Mar. 10, 2009

(54) EDUCTOR SWIRL BUSTER

(75) Inventor: Morris G. Anderson, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 550 days.

(21) Appl. No.: 11/259,700

(22) Filed: Oct. 25, 2005

(65) Prior Publication Data
US 2007/0089396 A1    Apr. 26, 2007

(51) Int. Cl.
*F02K 1/36* (2006.01)
(52) U.S. Cl. ............... 60/269; 60/39.5; 60/770; 239/265.17
(58) Field of Classification Search .............. 60/262, 60/264, 269, 770, 39.5; 239/265.11, 265.17
See application file for complete search history.

(56) References Cited

U.S. PATENT DOCUMENTS

| | | | |
|---|---|---|---|
| 2,735,499 A * | 2/1956 | Ehlers .................. | 60/264 |
| 3,048,376 A | 8/1962 | Howald et al. | |
| 3,710,890 A | 1/1973 | True et al. | |
| 4,045,957 A | 9/1977 | DiSabato | |
| 4,145,878 A | 3/1979 | Markowski | |
| 4,147,029 A | 4/1979 | Sargisson | |
| 4,548,034 A | 10/1985 | Maguire | |
| 4,819,425 A | 4/1989 | Farquhar et al. | |
| 5,381,655 A | 1/1995 | Orlando et al. | |
| 5,517,865 A | 5/1996 | Wisler et al. | |
| 5,943,856 A | 8/1999 | Lillibridge et al. | |
| 6,804,948 B2 | 10/2004 | Oishi | |
| 2002/0139120 A1 | 10/2002 | Sheoran et al. | |
| 2005/0268595 A1 * | 12/2005 | Steyer et al. .......... | 60/204 |

FOREIGN PATENT DOCUMENTS

WO    9316280 A1    8/1993

OTHER PUBLICATIONS

EP Search Report, 06122847.4 dated Aug. 8, 2008.

* cited by examiner

*Primary Examiner*—Louis J Casaregola
(74) *Attorney, Agent, or Firm*—Ingrassia Fisher & Lorenz, P.C.

(57) ABSTRACT

A system is provided in an aircraft that includes a power unit and an eductor. The power unit has a nozzle, and is configured to exhaust gas, a portion of which flows in a swirling motion, through the nozzle. The eductor communicates with the power unit and includes a housing and a plurality of flow straighteners. The housing has an inlet, an outlet, and an inner peripheral surface that defines a flow passage. The inlet is configured to surround at least a portion of the nozzle and to receive the gas, and the outlet is configured to exhaust the gas. The plurality of flow straighteners extend radially inwardly from the housing inner surface into the flow passage and are configured to reduce swirl motion of the gas that flows therethrough. The power unit may be an auxiliary power unit or a turboshaft engine.

16 Claims, 2 Drawing Sheets

EDUCTOR SWIRL BUSTER

STATEMENT REGARDING FEDERALLY SPONSORED RESEARCH OR DEVELOPMENT

This invention was made with Government support under DAAH10-03-2-0007awarded by the United States Army. The Government has certain rights in this invention.

TECHNICAL FIELD

The present invention relates to an eductor and, more particularly, to mechanisms for minimizing the impact of swirling motion of exhaust gas that enters the eductor.

BACKGROUND

Engines, for example, auxiliary power units ("APU"), are used in aircraft to provide electrical power and compressed air to various parts therein. When an aircraft is on the ground, its main source of electrical power comes from the APU. In particular, the APU can power the electrical systems, environmental control systems, air drive hydraulic pumps, and the starters for the engines. When an aircraft is in flight, the APU may provide pneumatic and/or electric power to the aircraft.

Typically, the APU is located in the aft section of the aircraft, at or near the tailcone section. The APU may communicate with an opening in the aircraft fuselage to allow exhaust gas from the APU and other components to flow therethrough. In some aircraft, an eductor is mounted between the APU and the fuselage opening. The eductor is configured to provide APU cooling, compartment cooling, oil cooling, and an interface for the dumping of surge bleed control air, and the eductor-cooled gas is either redirected back to the APU or to other components of the aircraft or is exhausted out the fuselage opening. The eductor includes an inlet, an outlet, and a flow path therebetween and may include an oil cooler coupled thereto. Conventionally, the eductor inlet is suitably sized to receive a portion of the APU or other component disposed between the APU and eductor to form a radial gap therebetween. The radial gap may communicate with other components of the aircraft, such as, for example, a bleed air plenum or the oil cooler.

Although conventional eductors are relatively effective for cooling and exhausting gas, they suffer from drawbacks. For example, in some instances, the exhaust gas flows through the eductor in a swirling motion. As a result, the gas may not flow entirely out of the aircraft. In particular, a portion of the exhaust gas may recirculate back into the APU or into the bleed air plenum via the eductor inlet gap. Another portion of the gases may swirl within the eductor, but may not flow out the eductor outlet. In either case, the eductor may not operate properly to cool the desired aircraft components. In the past, devices, such as deswirl vanes, have been placed in the APU exhaust duct upstream of the eductor. However, it has been found that such devices produce a large amount of back pressure to the engine, which may consequently compromise engine performance.

Hence, there is a need for a device that reduces or substantially eliminates swirling of exhaust gas without compromising engine performance. Preferably, an eductor is needed that is simple and inexpensive to implement.

BRIEF SUMMARY

The present invention provides a system in an aircraft that includes a power unit and an eductor. This invention also applies to helicopters and turboprop aircraft that include a turboshaft/turboprop engine and an eductor.

In one embodiment, and by way of example only, the power unit has a nozzle, and is configured to exhaust gas, a portion of which flows in a swirling motion, through the nozzle. The eductor communicates with the power unit and includes a housing and a plurality of flow straighteners. The housing has an inlet, an outlet, and an inner peripheral surface that defines a flow passage. The inlet is configured to surround at least a portion of the nozzle and to receive the gas, and the outlet is configured to exhaust the gas. The plurality of flow straighteners extend radially inwardly from the housing inner surface into the flow passage and are configured to reduce swirl motion of the gas that flows therethrough.

In another embodiment, and by way of example only, the system includes an auxiliary power unit and an eductor. The auxiliary power unit has a nozzle, and is configured to exhaust gas, a portion of which flows in a swirling motion, through the nozzle. The eductor communicates with the auxiliary power unit and includes a housing and a plurality of flow straighteners. The housing has an inlet, an outlet, and an inner peripheral surface defining a flow passage, the inlet is configured to receive the exhaust gas, and the outlet is configured to exhaust the gas. The plurality of flow straighteners extend radially inwardly from the housing inner surface into the flow passage and are configured to reduce swirl motion of the gas that flows therethrough. Each flow straightener includes an upstream edge, a downstream edge, and a side edge extending therebetween, at least one of the upstream edges is angled relative to the housing inner surface.

In still another embodiment, and by way of example only, the system includes a turboshaft/turboprop engine and an eductor. The turboshaft/turboprop engine has a nozzle, and is configured to exhaust gas, a portion of which flows in a swirling motion, through the nozzle. The eductor communicates with the turboshaft/turboprop engine and includes a housing and a plurality of flow straighteners. The housing has an inlet, an outlet, and an inner peripheral surface defining a flow passage, the inlet is configured to receive the exhaust gas, and the outlet is configured to exhaust the gas. The plurality of flow straighteners extend radially inwardly from the housing inner surface into the flow passage and are configured to reduce swirl motion of the gas that flows therethrough. Each flow straightener includes an upstream edge, a downstream edge, and a side edge extending therebetween, at least one of the upstream edges is angled relative to the housing inner surface.

Other independent features and advantages of the preferred eductor will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
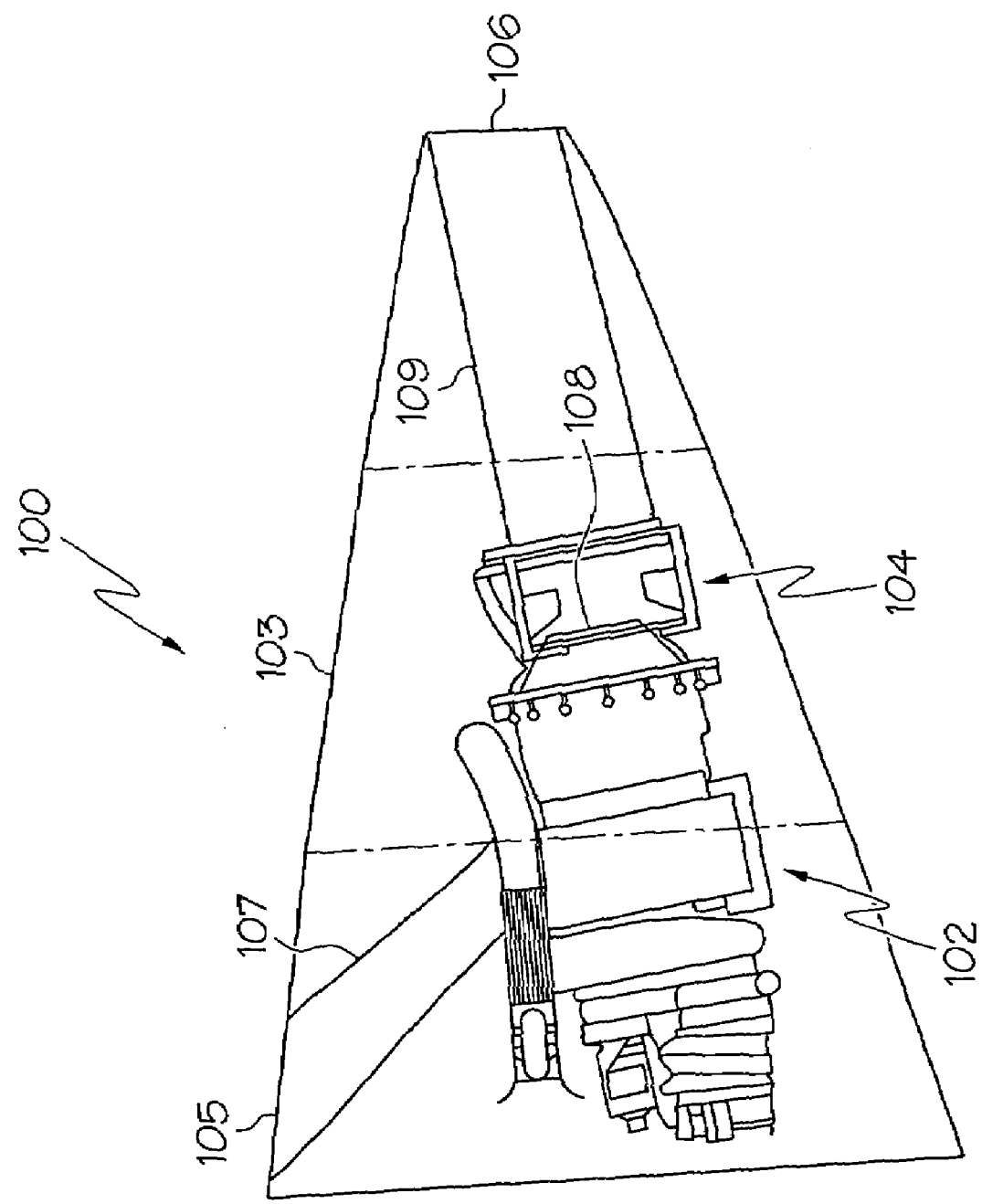
FIG. 1 is a cross-sectional view of an aircraft including a power unit and eductor disposed therein.

Turning now to the description, FIG. 1 illustrates a housing 100 within which a power unit 102 and an eductor 104 are disposed. The housing 100, which may be an aircraft tailcone or helicopter housing, is generally conical and has a sidewall 103 and inlet and exhaust openings 105, 106 that are formed therein. The power unit 102, which may be an auxiliary power unit ("APU") or a turboshaft/turboprop engine, may be used to drive a number of non-illustrated devices, including, for example, a gearbox, a generator, or a load compressor, is mounted within the housing 100 and receives air from an inlet duct 107 that extends between the power unit 102 and the inlet opening 105. The power unit 102 includes a nozzle 108 that communicates with the eductor 104. It will be appreciated that the power unit 102 and eductor 104 may indirectly or directly communicate with each other. In any case, exhaust gas from the power unit 102 flows through the eductor 104 and an exhaust duct 109 and exits the aircraft via the exhaust opening 106.

Figure 2:
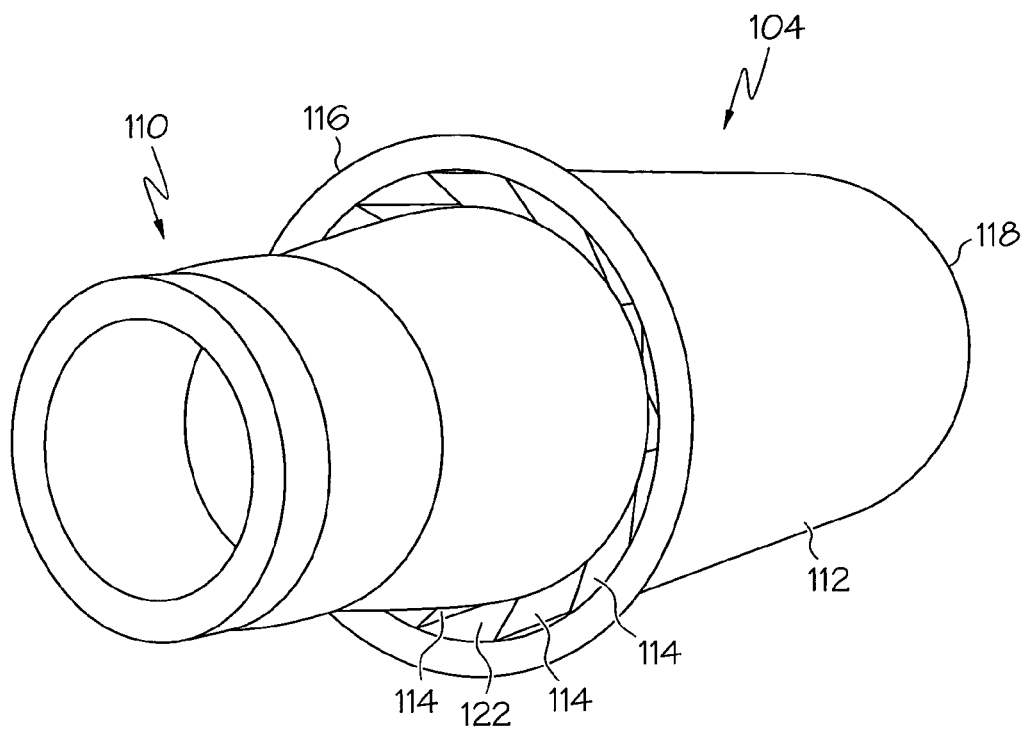
FIG. 2 is a perspective view of an exemplary eductor disposed at least partially around a section of an exhaust duct.
Figure 3:
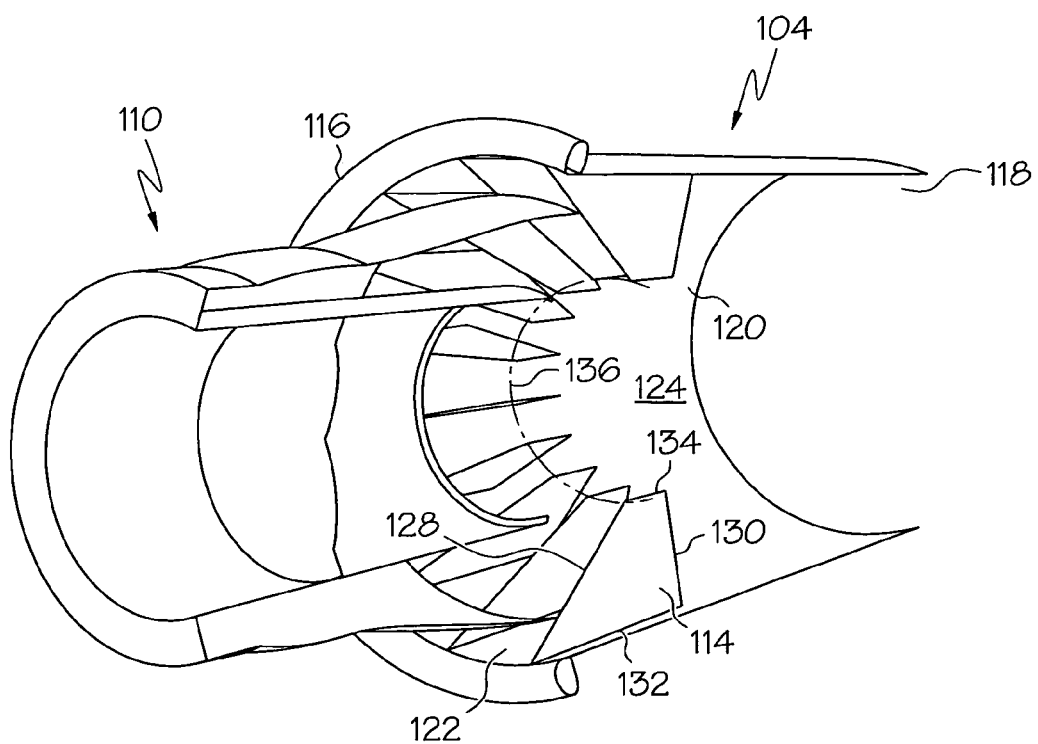
FIG. 3 is a cross-sectional view of the exemplary eductor and exhaust duct section shown in FIG. 2.

The eductor 104, shown in more detail in FIGS. 2 and 3, includes a housing 112 and a plurality of flow straighteners 114 disposed therein. The housing 112 is generally cylindrical and has an inlet 116, an outlet 118, and an inner surface 120. The inlet 116 receives power unit exhaust gas and is preferably configured to surround the nozzle 108. As briefly alluded to above, it will be appreciated that in other embodiments, the power unit 102 may communicate with the eductor 104 through an intermediate component, such as a mixer and the inlet 116 may be configured accordingly. Preferably, the housing 112 is dimensioned to form a radial gap 122 between the inlet 116 and nozzle 108 to provide communication between other spaces in the tailcone 100 or other aircraft components, such as a bleed air plenum or an oil cooler, and the eductor 104. The outlet 118 communicates with the exhaust opening 106 to remove the power unit exhaust gas from the aircraft.

The inner surface 120 defines a flow passage 124 that extends between the inlet 116 and outlet 118. Although the flow passage 124 is depicted as being substantially cylindrical, it may have any other suitable configuration for increasing the efficiency of cooling the exhaust gas and directing the exhaust gas outward. For example, the flow passage 124 may be a converging or diverging flowpath.

As briefly mentioned above, the flow straighteners 114 are disposed within the flow passage 124 and are configured to reduce the swirling movement of the exhaust gas as it travels therethrough. In this regard, the flow straighteners 114 each extend radially inwardly from the eductor inner surface 120. The flow straighteners 114 may be integrally formed as part of the eductor 104, or may be separately manufactured from the eductor 104 and subsequently coupled to the eductor inner surface 120. The flow straighteners 114 may be constructed from any material suitable for withstanding the high temperatures of the power unit exhaust gas.

The flow straighteners 114 are preferably substantially evenly aligned at one end of the eductor 104, most preferably, adjacent the inlet 116. Additionally, as shown in FIGS. 2 and 3, the flow straighteners 114 are preferably evenly spaced apart from one another. Although a total of sixteen flow straighteners 114 are shown in FIGS. 2 and 3, it will be appreciated that the particular number of flow straighteners 114 used may depend, in part, on the size of the eductor housing 112 and the length of the flow passage 124; accordingly, more or fewer flow straighteners 114 may alternatively be employed. Moreover, although the flow straighteners 114 are illustrated as extending partially along the length of the flow passage 124, the flow straighteners 114 may alternatively extend along the entire length of the flow passage 124. Each of the flow straighteners 114 preferably has substantially the same axial length, as shown in FIG. 3. However, it will be appreciated that the flow straighteners 114 may alternatively each have varying lengths. In alternate embodiments, the angular spacing of the flow strengtheners may also be uneven to reduce vibration characteristics of the system.

It will be appreciated that the flow straighteners 114 may have any one of numerous suitable configurations to substantially remove the swirling motion of the exhaust gas and to direct the gas along a relatively straight flow path through the eductor 104. Preferably, each of the flow straighteners 114 is substantially flat. Additionally, each flow straightener 114 preferably has a trapezoidal shape; however, in some instances, it may be preferable for the flow straightener 114 to have a rectangular, square, or other suitable polygonal shape. In other instances, some of the flow straighteners 114 may vary in shape. Moreover, although the flow straighteners 114 depicted in FIG. 3 have sharp corners, it will be appreciated that the corners may alternatively be curved.

In one exemplary embodiment, as shown in FIG. 3, each flow straightener 114 includes an angled upstream edge 128, a downstream edge 130, and two side edges 132, 134 therebetween. Preferably, the upstream edge 128 is configured to be angled at least about 30 degrees relative to the eductor inner surface 120. However, it will be appreciated that any other suitable angle may be used. Although the embodiment shown in FIG. 3 illustrates the two side edges 132, 134 as being substantially parallel with each other, as alluded to above, it will be appreciated that the side edges 132, 134 may alternatively be non-parallel. In any case, one of the side edges 132 is coupled to the eductor inner surface 120, while the other side edge 134 is disposed in the flow passage 124, as shown in FIG. 3. A ring 136 or similar device may be coupled to each of the side edges 134 disposed in the flow passage 124 for maintaining the flow straighteners 114 in place.

Returning back to FIGS. 1 and 2, during aircraft operation, the exhaust gas exits the power unit 102 and is received by the eductor inlet 116 in a swirling motion. It will be appreciated that the exhaust gas may be mixed with other gases, such as bleed air, from other aircraft components, before reaching the eductor inlet 116. In any case, when the gases flow through the inlet 116 into the eductor 104, the flow straighteners 114 divide the gases into a plurality of gas streams. As the gas streams travel between the flow straighteners 114, the flow straighteners 114 straighten the flow, and eliminate or significantly reduce the swirling motion of the gas.

There has now been provided an eductor 104 that reduces or substantially eliminates swirling of exhaust gases without compromising engine performance. The flow straighteners 114 in the eductor 104 are simple and inexpensive to implement therein. Additionally, the flow straighteners 114 may be easily retrofitted into existing eductors.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft system comprising:
   a power unit having a nozzle, the power unit configured to exhaust gas, a portion of which flows in a swirling motion, through the nozzle; and
   an eductor in communication with the power unit, the eductor comprising:
      a housing having an inlet, an outlet, and an inner surface that defines a flow passage, the inlet configured to surround at least a portion of the nozzle and to receive the gas, and the outlet configured to exhaust the gas;
      a ring disposed in the flow passage; and
      a plurality of flow straighteners extending radially inwardly from the housing inner surface into the flow passage and configured to reduce swirl motion of the gas that flows therethrough, each flow straightener including an upstream edge, a downstream edge, and a first side edge and a second side edge extending therebetween, the upstream edge angled relative to the housing inner surface, the first side edges coupled to the housing inner surface, and the second side edges each coupled to the ring.

2. The system of claim 1, wherein the plurality of flow straighteners are substantially aligned at the housing inlet and are equally spaced apart from one another around the housing inner surface.

3. The system of claim 1, wherein the plurality of flow straighteners are disposed proximate the housing inlet.

4. The system of claim 1, wherein at least one of the flow straighteners is trapezoidally shaped.

5. The system of claim 1, wherein the plurality of flow straighteners each includes a second side edge that is substantially parallel to the first side edge.

6. The system of claim 1, wherein each of the downstream edges of the plurality of flow straighteners are aligned with each other.

7. The system of claim 1, wherein the power unit is an auxiliary power unit.

8. The system of claim 1, wherein the power unit is a turboshaft engine.

9. An aircraft system comprising:
   an auxiliary power unit having a nozzle, the auxiliary power unit configured to exhaust gas, a portion of which flows in a swirling motion, through the nozzle; and
   an eductor in communication with the auxiliary power unit, the eductor comprising:
      a housing having an inlet, an outlet, and an inner surface defining a flow passage, the inlet configured to receive the gas, and the outlet configured to exhaust the gas;
      a ring disposed in the flow passage; and
      a plurality of flow straighteners extending radially inwardly from the housing inner surface into the flow passage and configured to reduce swirl motion of the gas that flows therethrough, each flow straightener including an upstream edge, a downstream edge, and a first side edge and a second side edge extending therebetween, at least one of the upstream edges being angled relative to the housing inner surface, the first side edges coupled to the housing inner surface, and the second side edges each coupled to the ring.

10. The system of claim 9, wherein the plurality of flow straighteners are substantially aligned at the housing inlet and are equally spaced apart from one another around the housing inner surface.

11. The system of claim 9, wherein the plurality of flow straighteners are disposed proximate the housing inlet.

12. The system of claim 9, wherein at least one of the flow straighteners is trapezoidally shaped.

13. The system of claim 9, wherein the plurality of flow straighteners each includes a second side edge that is substantially parallel to the first side edge.

14. The system of claim 9, wherein each of the downstream edges of the plurality of flow straighteners are aligned with each other.

15. An aircraft system comprising:
   a turboshaft/turboprop engine having a nozzle, the turboshaft/turboprop engine configured to exhaust gas, a portion of which flows in a swirling motion, through the nozzle; and
   an eductor in communication with the turboshaft/turboprop engine, the eductor comprising:
      a housing having an inlet, an outlet, and an inner surface defining a flow passage, the inlet configured to receive the gas, and the outlet configured to exhaust the gas;
      a ring disposed in the flow passage; and
      a plurality of flow straighteners extending radially inwardly from the housing inner surface into the flow passage and configured to reduce swirl motion of the gas that flows therethrough, each flow straightener including an upstream edge, a downstream edge, and a first side edge and a second side edge extending therebetween, at least one of the upstream edges being angled relative to the housing inner surface, the first side edges coupled to the housing inner surface, and the second side edges each coupled to the ring.

16. The system of claim 15, wherein the plurality of flow straighteners are substantially aligned at the housing inlet and are equally spaced apart from one another around the housing inner surface.

* * * * *